(12) United States Patent
Hayakawa

(10) Patent No.: US 6,459,551 B1
(45) Date of Patent: *Oct. 1, 2002

(54) THIN FILM MAGNETIC HEAD

(75) Inventor: Yasuo Hayakawa, Niigata-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/468,016

(22) Filed: Dec. 20, 1999

(30) Foreign Application Priority Data

Dec. 21, 1998 (JP) .......................... 10-363493

(51) Int. Cl.$^7$ ................................. G11B 5/39
(52) U.S. Cl. ........................ 360/313; 360/126
(58) Field of Search ................ 360/320, 313, 360/324, 324.1, 126; 324/252; 338/32; 365/8, 158, 126

(56) References Cited

U.S. PATENT DOCUMENTS

| | | | |
|---|---|---|---|
| 4,517,037 A | * 5/1985 | Francis et al. | 156/89 |
| 4,783,368 A | * 11/1988 | Yamamoto et al. | 428/408 |
| 5,225,951 A | * 7/1993 | Kira et al. | 360/113 |
| 5,644,455 A | 7/1997 | Schultz | 360/113 |
| 6,069,475 A | * 5/2000 | Isomura et al. | 324/244 |
| 6,075,679 A | * 6/2000 | Saito et al. | 360/113 |
| 6,163,436 A | * 12/2000 | Sasaki et al. | 360/126 |
| 6,188,549 B1 | * 2/2001 | Wiitala | 360/320 |
| 6,219,206 B1 | * 4/2001 | Odai et al. | 360/320 |
| 6,252,749 B1 | * 6/2001 | Hayakawa | 360/320 |

FOREIGN PATENT DOCUMENTS

JP 01165185 * 6/1989

* cited by examiner

Primary Examiner—David Hudspeth
Assistant Examiner—Angel Castro
(74) Attorney, Agent, or Firm—Brinks Hofer Gilson & Lione

(57) ABSTRACT

The present invention provides a thin film magnetic head that can efficiently dissipate the heat generated by the stationary sensing current, suppress heat diffusion, firing loss, decrease of output levels and deterioration of exchange anisotropic magnetic field as well as being excellent in linear responses and having suppressed Barkhausen noises, wherein the magnetic head comprises at least the magnetoresistive element layer deposited on the lower shield layer via lower gap layer, and the upper shield layer deposited on the electrode layer via the upper gap layer, at least one of the lower gap layer and upper gap layer comprising the highly heat-conductive insulation layer containing at least Al, N, X and O, wherein X is one or plural kinds of the element selected from Si, B, Ge and C.

8 Claims, 16 Drawing Sheets

THIN FILM MAGNETIC HEAD

BACKGROUND OF THE INVENTION

1. Field of the Invention

The present invention relates to a thin magnetic head provided with a magnetoresistive element.

2. Description of the Related Art

Conventional thin film magnetic heads provided with a magnetoresistive element (MR element) known in the art include an anisotropic magnetoresistive head (AMR head) making use of-anisotropic magnetoresistive effect and a giant megnetoresistive (GMR) head making use of spin-dependent scattering of conduction electrons. A spin-valve magnetic head that exhibits a high magnetoresistive effect in a low external magnetic field is disclosed in the specification of U.S. Pat. No. 5,159,513 as one embodiment of the GMR head.

FIG. 23 illustrates the construction of the conventional AMR head. The conventional AMR head comprises a lower gap layer 8 formed on a lower shield layer 7 comprising a magnetic alloy such as Sendust (a Fe—Al—Si alloy). An AMR element layer 10 is laminated on this lower gap layer 8. This AMR element layer 10 is formed by depositing a non-magnetic layer 12 on a soft magnetic layer 11 followed by depositing a ferromagnetic layer (AMR feedstock layer) 13 on the non-magnetic layer 12. Magnetic layers 15 are provided at both sides of the AMR element layer 10, and conductive layers 16 are additionally provided on the magnetic layer 10.

An upper gap layer 18 is further formed on the conductive layers 16 and AMR element layer 10, and an upper shield layer 19 is further formed on the upper gap layer 18.

The ferromagnetic layer 13 that exhibits the AMR effect has been regarded to require two bias electric fields for optimum operation of this sort of the AMR head.

The first bias magnetic field is applied along the direction perpendicular to one face of a magnetic medium (the Z-direction in FIG. 23) and parallel to the face of the ferromagnetic layer 13, in order to allow resistance changes of the ferromagnetic layer 13 to linearly respond against the magnetic flux from the magnetic medium. This first bias magnetic field is usually termed a transverse bias, which allows the soft magnetic layer 11 to be magnetized along the Z-direction by a magnetic field generated by flowing a sensing current from the conductive layer 16 to the AMR element layer 10. Magnetization of the soft magnetic layer 11 endows the ferromagnetic layer 13 with a transverse bias along the Z-direction.

The second bias magnetic field is usually termed a vertical bias, which is applied parallel to the magnetic medium and film face of the ferromagnetic layer 13 (the X-direction in FIG. 1). The vertical bias magnetic field is applied in order to suppress Barkhausen noises generated by forming a number of magnetic domains in the ferromagnetic layer 13 or, in other words, to obtain a smooth resistance change with few noises against the magnetic flux from the magnetic medium.

The ferromagnetic layer 13 should be made to be a single magnetic domain for suppressing the Barkhausen noise described above. The vertical bias is usually applied by two methods for suppressing the Barkhausen noise. The first method comprise using a leak magnetic flux from the magnetic layer 15 by disposing two magnetic layers 15 and 15 at both sides of the ferromagnetic layer 13, while the second method comprises using an exchange anisotropic magnetic field generated at the contact-interface between an antiferromagnetic layer and ferromagnetic layer.

FIG. 24 shows the construction of a spin-valve type GMR head making use of the exchange anisotropic coupling of the antiferromagnetic layer.

The GMR head shown in FIG. 24 differs from the AMR head shown in FIG. 23 in that a GMR element layer 20 is provided instead of the AMR element layer 10.

The GMR element layer 20 is composed of a free ferromagnetic layer 22, non-magnetic intermediate layer 23, pinned ferromagnetic layer 24 and antiferromagnetic layer 25.

In accordance with the structure shown in FIG. 24, magnetization should be aligned toward the track direction while allowing the free ferromagnetic layer 22 to form a single magnetic domain by applying a bias along the track direction (X-direction in FIG. 24) using the magnetic layers 15 and 15, as well as aligning the magnetization of the pinned ferromagnetic layer 24 toward the Z-direction in FIG. 24, or along the Z-direction in FIG. 24 while allowing the pinned ferromagnetic layer 24 to form a single magnetic domain by applying a bias along the direction perpendicular to the magnetization of the free ferromagnetic layer 22. In other words, the direction of magnetization of the pinned ferromagnetic layer 24 should not be changed by the magnetic flux (Z-direction in FIG. 24). Rather, the linear response of the magnetoresistive effect is obtained by allowing the direction of the free ferromagnetic layer 22 to change within a rage of 90° ±θ° relative to the direction of magnetization of the pinned ferromagnetic layer 24.

Relatively a large bias magnetic field is required for fixing the direction of magnetization of the pinned ferromagnetic layer 24 along the Z-direction. The larger the bias magnetic field is, the better pinning effect is obtained. At least 100 Oe of the bias magnetic field is required for surmounting the anti-magnetic field along the Z-direction in FIG. 24 and for preventing fluctuation of the direction of magnetic field due to the magnetic flux from the magnetic medium. The method for obtaining such bias magnetic field as described above comprises to take advantage of the exchange anisotropic magnetic field generated by providing the antiferromagnetic layer 25 in close contact to the pinned ferromagnetic layer 24.

In the structure as shown in FIG. 24, magnetization of the ferromagnetic layer 24 is fixed along the Z-direction by the exchange anisotropic coupling generated by providing the antiferromagnetic layer 25 in close contact to the pinned ferromagnetic layer 24. Therefore, the electric resistance of the GMR element layer 20 is changed by changing the direction of magnetization of the free ferromagnetic layer 22 when a leak magnetic field from the magnetic medium traveling along the Y-direction is applied, thus enabling the leak magnetic field from the magnetic medium to be sensed by this resistance change.

The bias magnetic field is applied to the free ferromagnetic layer 22 for the purposes of securing linear responses and suppressing the Barkhausen noise generated by forming many magnetic domains. The bias is applied by the same method as in the vertical vias in the AMR head or, in other words, the leak magnetic flux from the magnetic layer 15 is utilized as the bias by providing the magnetic layers 15 at both sides of the free ferromagnetic layer 22 in the construction as shown in FIG. 24.

It is known in the art that the temperature in the vicinity of the MR element layer such as the AMR element layer and GMR element layer is readily increased up to 120° C. due to the heat caused by the stationary sensing current during operation of the thin film magnetic head. The MR element is so sensitive to temperature changes that electric resistance of the ferromagnetic layer is changed due to temperature increase of the MR element layer by the heat generated as described above, causing disturbance of read signals. Moreover, the exchange anisotropic magnetic field generated by the antiferromagnetic layer comprising FeMn and the like is also very sensitive to temperature changes in the GMR element, and the exchange anisotropic magnetic field nearly linearly decays -against the temperature before it is extinguished at about 150° C. (blocking temperature: Tb). Therefore, a stable exchange anisotropic magnetic field can not be obtained due to the problems as described above.

The conventional thin film magnetic head for solving the problems as hitherto described comprises upper and lower gap layers 8 and 18 made of alumina ($Al_2O_3$) in the AMR element layer 10 or GMR element layer 20. The generated heat is dissipated by slowly transferring it to the shield layers 7 and 19 through the gap layers 8 and 18.

In order to comply with ever growing recent requirements for further improving output levels of the thin film magnetic head, the stationary sensing current density flowing through the MR element layer should be increased by, for example, reducing the thickness or diminishing the length of the MR element.

However, the heat generated by the stationary sensing current cannot be sufficiently dissipated through the gap layers 8 and 18 made of alumina, when the stationary sensing current density is increased in the conventional thin film magnetic head. Consequently, defects and cracks are caused in the MR element layer, or elements are diffused among the layers constituting the MR element layer to disturb compositions of the component materials in each layer, thereby deteriorating linear responses or decreasing the suppressing effect for the Barkhausen noise. Accordingly, it was difficult to improve the output level by merely making the MR element small size or improving the current density by increasing the stationary sensing current.

SUMMARY OF THE INVENTION

Accordingly, the object of the present invention is to provide a thin film magnetic head having good linear responses and suppressed Barkhausen noises, wherein the MR element layer is prevented from heat diffusion and baking loss due to temperature increase by allowing the heat generated by the stationary sensing current to be effectively dissipated to suppress decrease of output levels and deterioration of the exchange anisotropic magnetic field.

With respect to the materials to be used for the gap layers, it was presumed that the heat generated by the stationary sensing current could be efficiently dissipated by using aluminum nitride (AlN) having good heat conductivity in place of alumina that has been conventionally used.

However, since a photolithographic process comprising coating of a resist, exposing to light, development with a strong alkaline solution and rinsing with water is required for forming the MR head, a short-circuit of the flowing sensing current may occur when the gap layer is composed of an aluminum nitride film, because aluminum nitride is very soluble in the strong alkaline solution. Further, aluminum nitride readily reacts with water to form a water-soluble compound. Therefore, reliability of the MR head is compromised because the aluminum nitride film is dissolved in the rinse process for forming the MR head, or by absorbing moisture in the air even after the MR head has been formed.

Otherwise, since the aluminum nitride film has a large film stress, the film is liable to be pealed off during or after forming the MR head to leave some problems in reliability.

For solving these and other problems as described above, elements X selected from Si, B, Ge and C that readily react with N and have good resistivity against a strong alkaline solution and water was added to an insulation layer containing Al and N, as well as O that readily react with the elements X, to obtain a highly heat-conductive insulation layer containing Al, N, X and O, thereby constructing a gap layer comprising the highly heat-conductive insulation layer. Otherwise, the object of the present invention can be attained by forming a highly heat-conductive insulation layer containing Al, N, X and O in the gap layer in order to endow the gap layer with a better heat conductivity than alumina, much smaller solubility in the strong alkaline solution and water as compared with the film comprising aluminum nitride, and having small film stress.

For solving the foregoing problems, there is provided in accordance with one aspect of the present invention a thin film magnetic head comprising at least a layer of a magnetoresistive element formed on a lower shield layer via a lower gap layer, electrode layers for imparting a sensing current to the magnetoresistive element, and an upper shield layer formed on the electrode layer via an upper gap layer, wherein at least one of the lower gap layer and upper gap layer has a highly heat-conductive insulation layer containing at least Al, N, X and O, the element X being at least one element selected from Si, B, Ge and C.

The construction of the thin film magnetic head in accordance with the present invention allows the heat generated by the stationary sensing current to be efficiently dissipated. Therefore, output levels of the magnetic head are improved and a sufficient intensity of the exchange anisotropic magnetic field required for the thin film can be applied while obtaining a resistance change excellent in linear response without causing any Barkhausen noise, thereby enabling excellent read performance to be obtained. The gap layer comprising a highly heat-conductive insulation layer containing at least Al, N, X and O has a good resistivity against the strong alkaline solution and water. Small film stress can prevent the film from being peeled off during or after forming the MR head to provide a reliable product.

It is preferable for improving heat conductivity and resistance against the strong alkaline solution and water in the thin film magnetic film according to the present invention that the highly heat-conductive insulation layer is composed of a texture comprising fine crystals comprising fine crystalline AlN grains and a crystal containing at least two elements comprising the elements X, N and O, or a texture comprising a mixed phase of a fine crystalline phase comprising the fine crystalline AlN grains and an amorphous phase containing at least two elements X, N and O.

It is also preferable for improving heat conductivity and resistance against the strong alkaline solution and water in the thin film magnetic film according to the present invention that the element X in the highly heat-conductive insulation layer is chemically bound to at least one of the elements O and N.

Also, it is preferable for improving heat conductivity and resistance against the strong alkaline solution and water of the gap phase, and for reducing the film stress in the thin film magnetic film according to the present invention that the highly heat-conductive insulation layer contains the elements X and O in with a composition ratio within the range of more than zero atomic percentages and less than 20 atomic percentages, respectively.

DESCRIPTION OF THE PREFERRED EMBODIMENT

Figure 1:
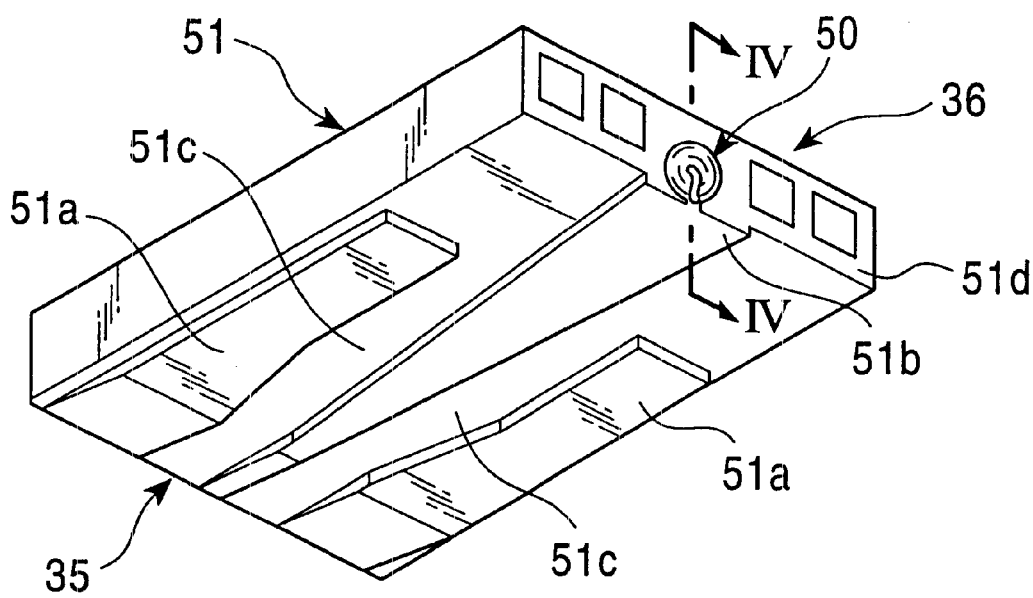
FIG. 1 is a perspective view showing the first embodiment of the thin film magnetic head according to the present invention.

One embodiment of the thin film magnetic head according to the present invention will now be described with reference to the attached drawings.

FIGS. 1 to 4 show embodiments of the magnetic head according to the first embodiment of the present invention.

The magnetic head in accordance with the first embodiment represents a floating type magnetic head to be mounted on a hard disk device. In a slider 51 of the magnetic head, the side represented by the reference numeral 35 in FIG. 1 corresponds to the leading side directed toward the upper stream side of the travel direction of the disk face, while the side represented by the reference numeral 36 in FIG. 1 corresponds to the trailing side. Rail-shaped ABS faces 51a, 51a and 51b, and air groups 51c and 51c are formed on the face confronting the disk of the slider 51. A thin film magnetic head 50 is provided at an end face 51d at the trailing side of the slider 51.

Figure 2:
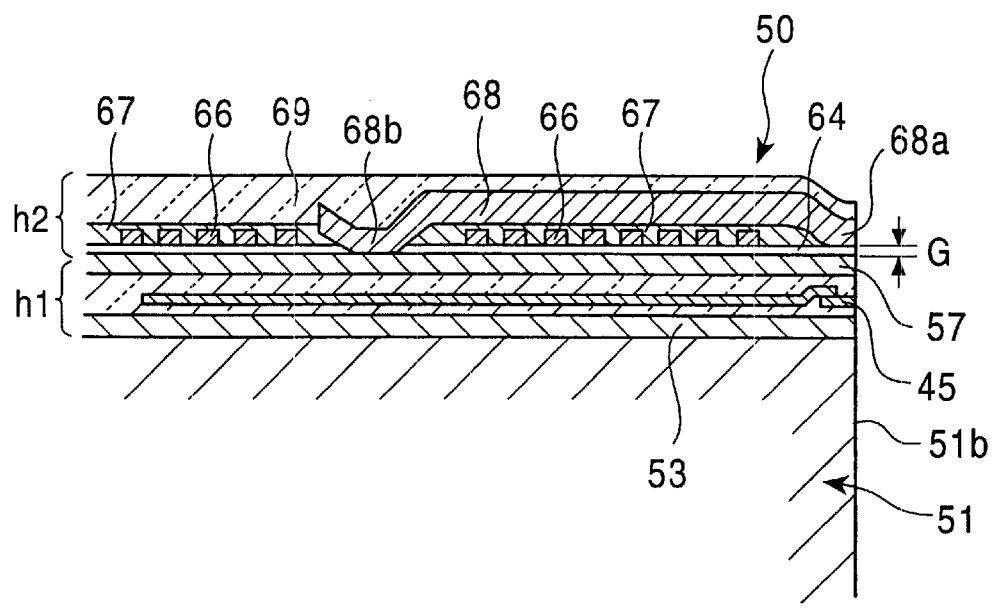
FIG. 2 is a cross section showing a main part of the thin film magnetic head shown in FIG. 1.
Figure 3:
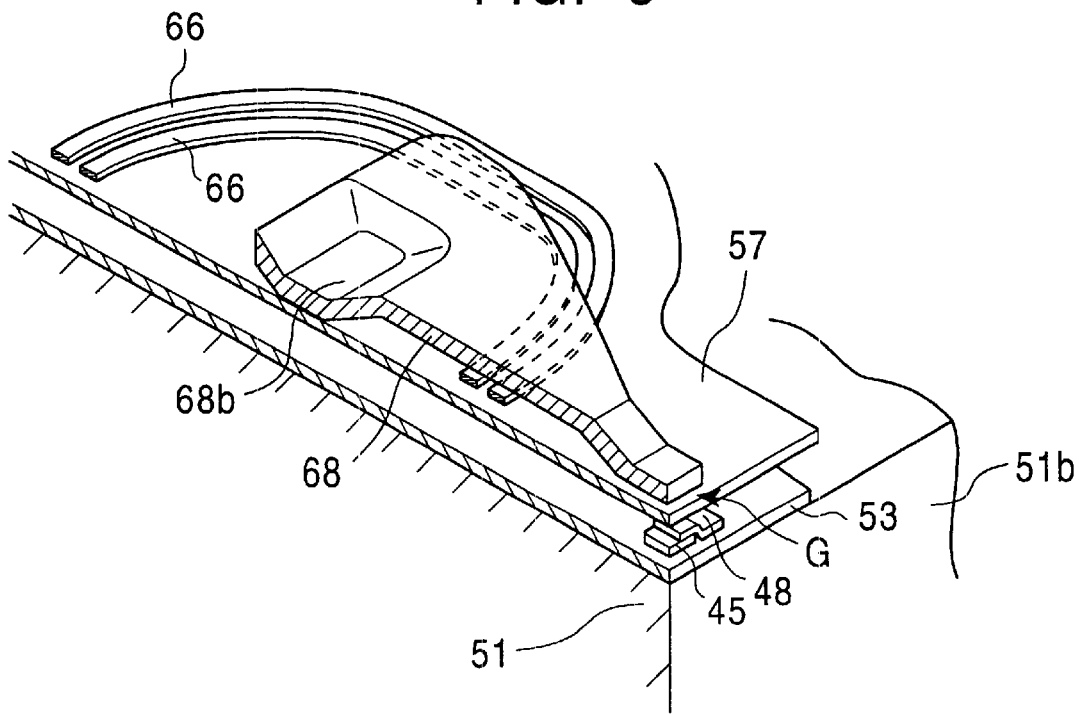
FIG. 3 is a perspective view of a cross section of a part of the thin film magnetic head shown in FIG. 1.

The thin film magnetic head 50 shown in this embodiment corresponds to a composite magnetic head having the cross sectional structures as shown in FIGS. 2 and 3, which are constructed by laminating a MR head (reading head) h1 and an inductive head (writing head) h2 on the side face 51d at the trailing side of the slider 51.

Figure 4:
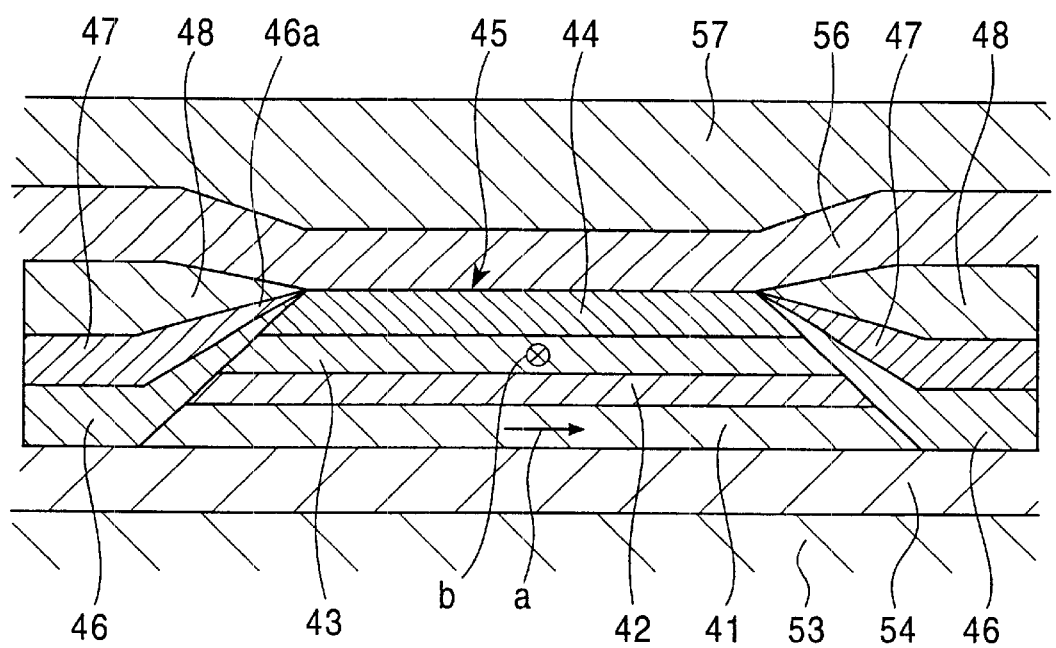
FIG. 4 is a cross section showing the structure of the MR head provided in the thin film magnetic head shown in FIG. 1.

The MR head h1 in this embodiment serves for reading magnetic signals by sensing the leak magnetic flux from a recording medium suck as a disk using magnetoresistive effect. As shown in FIG. 4, a lower gap layer 54 is provided in the MR head h1 on a lower shield 53 comprising a magnetic alloy such as Sendust (a Fe—Al—Si alloy) formed at the end of the trailing side of the slider 51.

A GMR element layer 45 as a magnetoresistive element layer is laminated on this lower gap layer 54. Ferromagnetic layers 46 and 46 comprising a Co—Pt alloy are provided at both sides of the GMR element layer 45, and an insulation layer 47 made of Ta and an electrode layer 48 made of Cr are laminated on the ferromagnetic layers 46. The electrode layer 48 serves for imparting a sensing current to the GMR element layer 45. The ferromagnetic layers 46 and 46 are provided for ensuring linear responses and suppressing Barkhausen noises by applying the leak magnetic flux as a bias field to a free ferromagnetic layer 41 to be described hereinafter.

An upper gap layer 56 is formed on the GMR element 45 and electrode layer 48, and an upper shield layer 57 is formed on the upper gap layer. The upper shield layer 57 also serves as a lower core layer of the inductive head h2 to be provided on the upper shield layer. It is preferable for allowing the heat generated by the stationary sensing current to be efficiently dissipated, for improving resistance against a strong alkaline solution and water, and for reducing the film stress of the gap layer that at least one of the lower gap layer 54 and upper gap layer 56 contains a highly heat-conductive insulation layer containing Al, N, X and O. More preferably, both of the lower gap layer 54 and upper gap layer 56 have the highly heat-conductive insulation layers.

The element X described above corresponds to at least one or plural elements selected from Si, B, Ge and C. This highly heat-conductive insulation layer has a better heat-conductance than alumina and is superior to AlN in resistance against the strong alkaline solution and water, besides having smaller film stress than AlN.

The highly heat-conductive insulation layer is composed of a texture comprising fine crystals containing a fine crystalline phase of AlN and a crystalline phase comprising crystals containing at least plural elements among X, N and O; or a texture comprising a mixed phase of a fine crystalline phase comprising fine crystalline grains of AlN and an amorphous phase containing at least plural elements among the element X, N and O.

It is preferable for improving resistance against the strong alkaline solution and water that the element X in the highly heat-conductive insulation layer is chemically bound to at least one of O and N.

When the highly heat-conductive insulation layer is composed of a texture comprising the crystalline phase as described above, it is preferable for improving resistance against the strong alkaline solution and water that the crystal containing at least plural elements among the element X, N and O contains a compound of the element X and N such as $Si_3N_4$ and BN, or a compound of the element X and O such as $SiO_2$.

When the highly heat-conductive insulation layer is composed of a mixed phase of the fine crystalline phase and amorphous phase as described above, it is preferable for improving resistance against the strong alkaline solution and water that the amorphous phase contains the element X chemically bound to at least one of O and N.

The highly heat-conductive insulation layer preferably contains the element X in a composition ratio of 2 atomic percentages (abbreviated as at % hereinafter) to 20 at %, more preferably in a ratio of 5 at % to 15 at %.

When the amount of addition of the element X exceeds 20 at %, the content of AlN is reduced to deteriorate heat conductivity of the gap layer, thereby making it impossible to sufficiently dissipate the heat generated by the stationary sensing current to result in deterioration of linear responses or decrease of the Barkhausen noise suppressing effect.

When the content of the element X is less than 2 at %, the content of the compound of the element X and N such as $Si_3N_4$ and BN, or the compound of the element X and O such as $SiO_2$ is reduced in the crystal, or the amorphous phase contains no element X, thus resistance against the strong alkaline solution and water is deteriorated, or the film stress becomes large.

It is preferable that the highly heat-conductive insulation film contains oxygen in a composition ratio of zero at % to 20 at %, more preferably 5 at % to 15 at %.

When the amount of addition of oxygen exceeds 20 at %, the content of AlN is so reduced that heat conductivity of the gap layer becomes poor to fail in dissipating the heat generated by the stationary sensing current, thereby deteriorating linear responses and reducing the Barkhausen noise suppressing effect. When no oxygen is added, on the other hand, the crystal contains no compound of the element X and O such as $SiO_2$, or the amorphous phase contains substantially no oxygen, thus deteriorating resistance against the strong alkaline solution and water.

While it is preferable that the lower gap layer 54 and/or upper gap layer 56 is composed of the highly heat-conductive insulation layer, a part of the layers may have a multi-layer structure composed of a non-magnetic material such as alumina ($Al_2O_3$). It is preferable in this case for efficiently dissipating the heat generated by the stationary sensing current that the non-magnetic material such as alumina is provided at outside of the highly heat-conductive insulation layer. The non-magnetic material such as alumina provided at outside of the highly heat-conductive insulation layer also serves as a flattening layer for flattening the rough surface formed on the upper insulation layer of the GMR element layer 45.

In the inductive head h2, a gap layer 64 is formed on the lower core layer 57, on which a coil layer 66 patterned to be a planar spiral is formed, and the coil layer 66 is surrounded by an insulator layer 67. The upper core layer 68 formed on the insulation feedstock layer 67 is provided so that its top end 68a confronts the lower core layer at the ABS face 51b leaving a minute gap, and its bottom end 68b is magnetically coupled with the lower core layer 57.

A protective layer 69 comprising alumina is provided on the upper core layer 68.

A recording current is imparted to the coil layer 66 in the inductive head h2 to flow the recording current from the coil layer 66 through the core layer. Magnetic signals can be recorded on a recording medium such as a disk by the leak magnetic field from the tip of the lower core layer 57 and upper core layer 68 at the magnetic gap portion G.

Since resistance of the GMR element layer 45 changes depending on the minute leak magnetic field from the recording medium such as a hard disk in the MR head h1, the recorded information in the recording medium can be read by sensing this resistance change.

The GMR element layer 45 is composed of a laminate having a cross section of a trapezoid formed by laminating the free ferromagnetic layer 41, non-magnetic layer 42, pinned ferromagnetic layer 43 and antiferromagnetic layer 44.

While the ferromagnetic layers 41 and 43 comprise thin films of a ferromagnetic materials, they are actually made of a Ni—Fe alloy, Co—Fe alloy, Co and Ni—Fe—Co alloy. The ferromagnetic layer 41 may be formed of a Co layer, and the ferromagnetic layer 43 may be formed of a Ni—Fe alloy layer, a laminated structure of the Co layer and a Ni—Fe alloy layer, or a laminated structure of a Co—Fe alloy layer and Ni—Fe alloy layer. When a dual-layer structure of the Co layer and Ni—Fe alloy layer is formed, it is preferable to be a structure in which the thin Co layer is disposed at the non-magnetic layer 42 side. When a dual-layer structure of the Co—Fe alloy layer and Ni—Fe alloy layer is formed, on the other hand, it is preferable to dispose the thin Co—Fe alloy layer at the non-magnetic layer 42 side.

The constructions as described above were selected because, in the mechanism for generating the giant magnetoresistive effect by the structure sandwiching the non-magnetic layer 42 with the ferromagnetic layers 41 and 43, the spin-dependent scattering effect of the conduction electrons is large at the boundary between Co and Cu, and factors other than the spin-dependent scattering effect of the conduction electrons are less liable to occur when the ferromagnetic layers 41 and 43 are composed of the same kind of material than of different kinds of materials with each other, thereby enabling higher magnetoresistive effect to be obtained. Accordingly, the non-magnetic layer 42 side of the ferromagnetic layer 41 is preferably replaced with a Co layer having a given thickness when the ferromagnetic layer 43 is composed of Co. An alloy containing a larger amount of Co at the non-magnetic layer 42 side of the ferromagnetic layer 42 and having a concentration gradient layer in which the Co concentration gradually diluted toward the non-magnetic layer 42 side may be used, instead of providing a uniform Co layer.

When the ferromagnetic layers 41 and 43 are composed of the Co—Fe alloy layers having the constructions in which the non-magnetic layer 42 is sandwiched with the ferromagnetic layers 41 and 43, the spin-dependent scattering effect of the conduction electrons at the boundary between the Co—Fe alloy layer and Cu layer becomes large while lowering the possibility of causing the factors other than the spin-dependent scattering effect of the conduction electrons, thus allowing higher magnetoresistive effect to be obtained.

The non-magnetic layer 42 comprises a non-magnetic material represented by Cu, Cr, Au and Ag deposited with a thickness of about 20 to 40 angstroms. When the non-magnetic layer 42 is thinner than 20 angstroms, the ferromagnetic layer 41 can readily couple with the ferromagnetic layer 43. It is not preferable, on the other hand, that the non-magnetic layer 42 is thicker than 40 angstroms, because the proportion of the conduction electrons that are scattered at the boundary between the ferromagnetic layers 41 and 43 to cause the magnetoresistive effect is decreased, thereby the magnetoresistive effect is reduced due to shunt effect of the electric current.

The antiferromagnetic layer 44 is preferably composed of, for example, a $X_1$—Mn based alloy. The element $X_1$ in the above composition formula preferably comprises at least one or plural elements among Ru, Rh, Ir, Pd and Pt.

It is preferable that the content of the element $X_1$ when the element $X_1$ in the $X_1$—Mn based alloy comprises one kind of the metal atom is in the range of 10 to 45 at % in Ru, 10 to 40 at % in Rh, 10 to 40 at % in Ir, 10 to 25 at % in Pd and 10 to 25 at % in Pt. For example, the term "10 to 40 at %" as described above denotes that the content is 10 at % or more and 45 at % or less, and the upper limit and lower limit of the numerical values represented by "to" are prescribed to be "or more" and "or less", respectively.

While the Mn based alloy having the composition ranges as described above has an irregular crystal structure, the term "irregular crystal structure" denotes that it does not belong to a regular crystal structure such as a face-centered orthogonal crystal system (fct regular lattice; for example a CuAuI structure). The Mn based alloy to be used herein is not subjected to a heat treatment at a high temperature for a long period of time after deposition by sputtering, in order to transform the crystal structure into a regular crystal structure such as a face-centered orthogonal crystal system (such as the CuAuI structure). The irregular crystal structure refers to a film immediately after deposited by a deposition method such as sputtering, or a film subjected to a conventional annealing treatment after the deposition.

More preferable range of the content of the element $X_1$ in the $X_1$—Mn based alloy (the element $X_1$ comprises at least one or plural elements among Ru, Rh, Ir, Pd and Pt) is 37 to 63 at %. The phrase "37 to 63 at %" as described above denote that the content is 37 at % or more and 63 at % or less, and the upper limit and lower limit of the numerical values represented by "to" are prescribed to be "or more" and "or less", respectively.

The $X_1$—Mn based alloy having the composition within the range described above has a face-centered cubic lattice in which $X_1$ and Mn are irregularly distributed immediately after forming the film by a deposition method such as sputtering. Although substantially no exchange anisotropic magnetic field is generated at the boundary on the ferromagnetic layer, an exchange anisotropic magnetic field ($H_{ex}$) with uniaxial anisotropy can be generated at the boundary on the ferromagnetic layer by transforming the crystal structure into a face-centered cubic lattice by subjecting the film to an annealing treatment in the magnetic field.

The antiferromagnetic layer 44 may comprise a $X_1$—Mn—$X_2$ based alloy. The element $X_1$ preferably comprises at least one or plural elements among Ru, Rh, Ir, Pd and Pt as hitherto described. The element $X_2$ preferably comprises at least one or plural elements among Au, Ag, Mg, Al, Si, P, Be, B, C, Se, Ti, V, Cr, Fe, Co, Ni, Cu, Zn, Ga, Ge, Y, Zn, Nb, Mo, Hf, Ta, W, Sn and In. The composition ratio between the element $X_1$ and Mn is in the range of 4:6 to 6:4 in at %, while the content of the element $X_2$ is in the range of 0.2 to 10 at %.

When the antiferromagnetic layer 44 comprises a $X_1$—Mn—$X_2$ based alloy, an exchange anisotropic magnetic field ($H_{ex}$) with uniaxial anisotropy can be also generated at the boundary on the ferromagnetic layers by subjecting the layer to an annealing treatment in a magnetic field after the deposition.

An exchange anisotropic magnetic field with uniaxial anisotropy can be applied at the boundary on the pinned ferromagnetic layer 43, provided that the antiferromagnetic layer 44 comprises the $X_1$—Mn based alloy or $X_1$—Mn—$X_2$ based alloy, thereby allowing rotation of magnetization relative to the external signal magnetic field of the ferromagnetic layer 43 to be pinned.

When the antiferromagnetic layer 44 comprises the $X_1$—Mn based alloy, its corrosion resistance is superior to that of the Fe—Mn alloy and variation of the exchange anisotropic magnetic field ($H_{ex}$) against temperature changes becomes small.

In the structure shown in FIG. 4, a bias magnetic field along the track direction (X-direction in FIG. 4) is applied to the free ferromagnetic layer 41 by the ferromagnetic layers 46 and 46 to align the magnetization by forming a single magnetic domain. The direction indicated by an arrow a in FIG. 4 represents the direction of magnetization of the free ferromagnetic layer 41. Magnetization is also fixed to the Z-direction by exchange anisotropic coupling generated by providing the antiferromagnetic layer 44 in contact with the pinned ferromagnetic layer 43. The direction indicated by an arrow b in FIG. 4 represents the direction of magnetization of the ferromagnetic layer 43. Electric resistance of the GMR element layer 45 changes by the directional change of magnetization of the free ferromagnetic layer 41 due to leak magnetic field applied by the magnetic medium travelling along the Y-direction, allowing the leak magnetic field from the magnetic medium to be sensed.

The magnetic head according to the first embodiment is provided with the MR head h1 comprising the gap layer having the highly heat-conductive insulation layer containing Al, N, X and O. The gap layer has excellent corrosion resistance and is hardly dissolved during the MR head processing steps to render the magnetic head practically applicable gap layer. Therefore, a reliable product can be provided since a short-circuit never occurs when flowing the sensing current. Also, since the highly heat-conductive gap layer having an insulation layer containing Al, N, X and O has a small film stress, the layer is never peeled off during or after forming the MR head, enabling a highly reliable product to be provided.

In addition, since the gap layer having a highly heat-conductive insulation layer containing Al, N, X and O has good heat-conductance, the heat generated by the sensing current can be efficiently dissipated from the gap layer event when the stationary sensing current density is increased, allowing defects and cracks in the magnetoresistive element layer to be prevented while preventing diffusion of elements among the layers constituting magnetoresistive element layer. Therefore, the problem of deterioration of the GMR element characteristics can be avoided. In the magnetic head according to the present invention, the heat generated by the stationary sensing current can be efficiently dissipated. Therefore, output levels of the magnetic head can be improved while enabling a sufficient intensity of exchange anisotropic magnetic field required for the thin film to be applied without causing Barkhausen noises. Accordingly, its reading performance can be improved by making the resistance change excellent in response to linear changes.

The structure of the magnetic head according to the second embodiment of the present invention will be described below.

Figure 5:
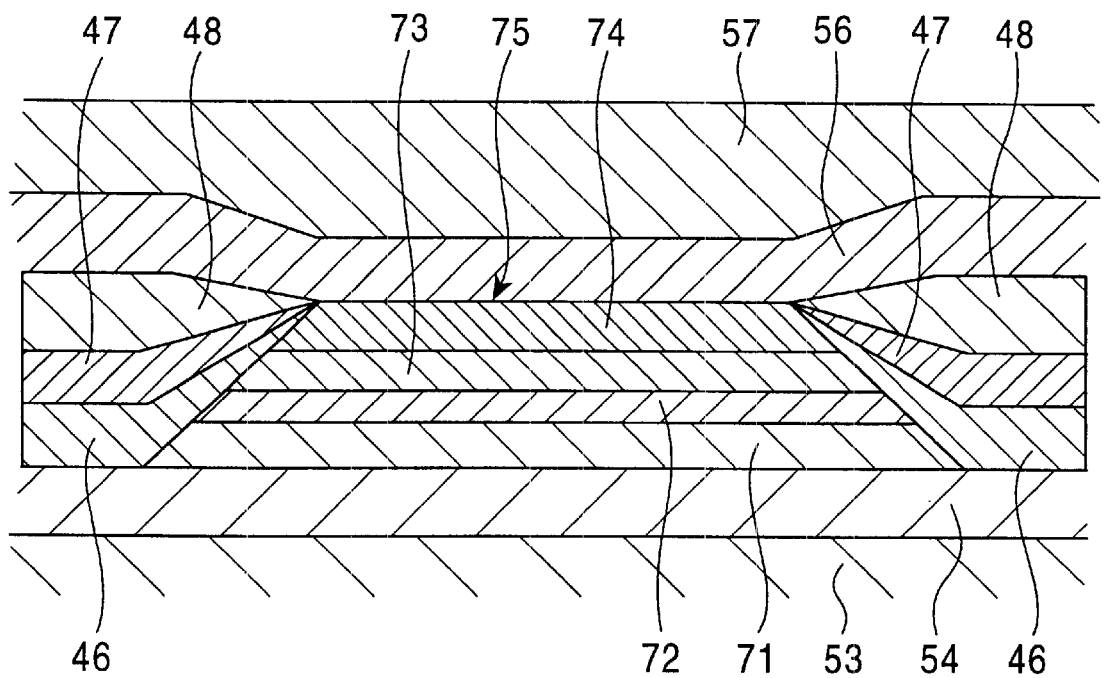
FIG. 5 is a cross section showing the structure of the MR head provided in the second embodiment of the thin film magnetic head according to the present invention.
Figure 5:
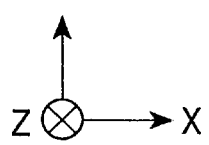

The magnetic head according to the second embodiment differs from the magnetic head according to the first embodiment in that an AMR element layer 75 as shown in FIG. 5 is used as the magnetoresistive element layer of the ME head h1.

The AMR element layer 75 comprises a non-magnetic layer 72 comprising Ta and the like formed on a soft magnetic layer 71 comprising a Ni—Fe—Nb alloy, a ferromagnetic layer (AMR feedstock layer) 73 comprising a Ni—Fe alloy formed on the non-magnetic layer 72, and a protective layer 74 comprising Ta and the like.

For the optimum operation of the MR head provided with the AMR element layer 75, two bias magnetic fields of the transverse bias and vertical bias are required for the ferromagnetic layer 73 exhibiting the AMR effect.

The transverse magnetic field is applied in order to allow resistance changes of the ferromagnetic layer 73 to linearly respond against the magnetic field from the magnetic medium. This bias magnetic field is applied from the direction perpendicular to the face of the magnetic medium (the Z-direction in FIG. 5) and parallel to the film face of the ferromagnetic layer 73. This transverse magnetic field is generated by flowing a sensing current from the electrode layer 48 to the AMR element layer 10.

The vertical bias magnetic field is applied in order to suppress the Barkhausen noise generated by forming a lot of magnetic domains in the ferromagnetic layer 73, or for rendering resistance to be smooth with few noises against the magnetic flux from the magnetic medium. The bias magnetic field is applied parallel to the magnetic medium and the film face of the ferromagnetic layer 73. This vertical bias magnetic field can be applied by taking advantage of the leak magnetic field from the ferromagnetic layers 46 and 46 disposed at the bottom sides of the ferromagnetic layer 73, which is made to be a single magnetic domain to suppress the Barkhausen noise.

Since the magnetic head according to the second embodiment is provided with the MR head h1 comprising a gap layer having a highly heat-conductive insulation layer containing at least Al, N, X and O, the same function and effect as in the magnetic head according to the first embodiment can be obtained.

While the GMR element layer 45 or AMR element 75 having such construction as described above was described as the magnetoresistive element layer in the magnetic head according to the embodiments described above, the construction is not necessarily limited thereto but other constructions may be used.

EXAMPLE

Example 1

After evacuating inside of the deposition chamber of a microwave magnetron sputtering apparatus used in this example at a pressure of $8.0 \times 10^{-7}$ torr or less, a mixed gas of argon and nitrogen (volume ratio; Ar:N=7:3) was introduced in the deposition chamber and the pressure was adjusted to $8.0 \times 10^{-3}$ torr. A substrate comprising Si and a target with a composition of Al—Si—O were used. An Al—N—Si—O gap layer with a thickness of 0.1 µm was deposited on the substrate by sputtering at a sputtering voltage of 800 W to prepare a sample (Example 1) with a width of 5 mm and a length of 20 mm.

An Al—N gap layer was deposited on the Si substrate by sputtering by the same method as used in Example 1 to prepare a sample for comparative purposes (Comparative Example 1), except that nitrogen was introduced into the deposition chamber instead of the mixed gas, an Al plate was used for the target, and the sputtering voltage was set to 800 W.

The structures of the gap layer texture of the samples prepared were investigated by the X-ray diffraction method. The results obtained are shown in FIG. 6.

Figure 6:
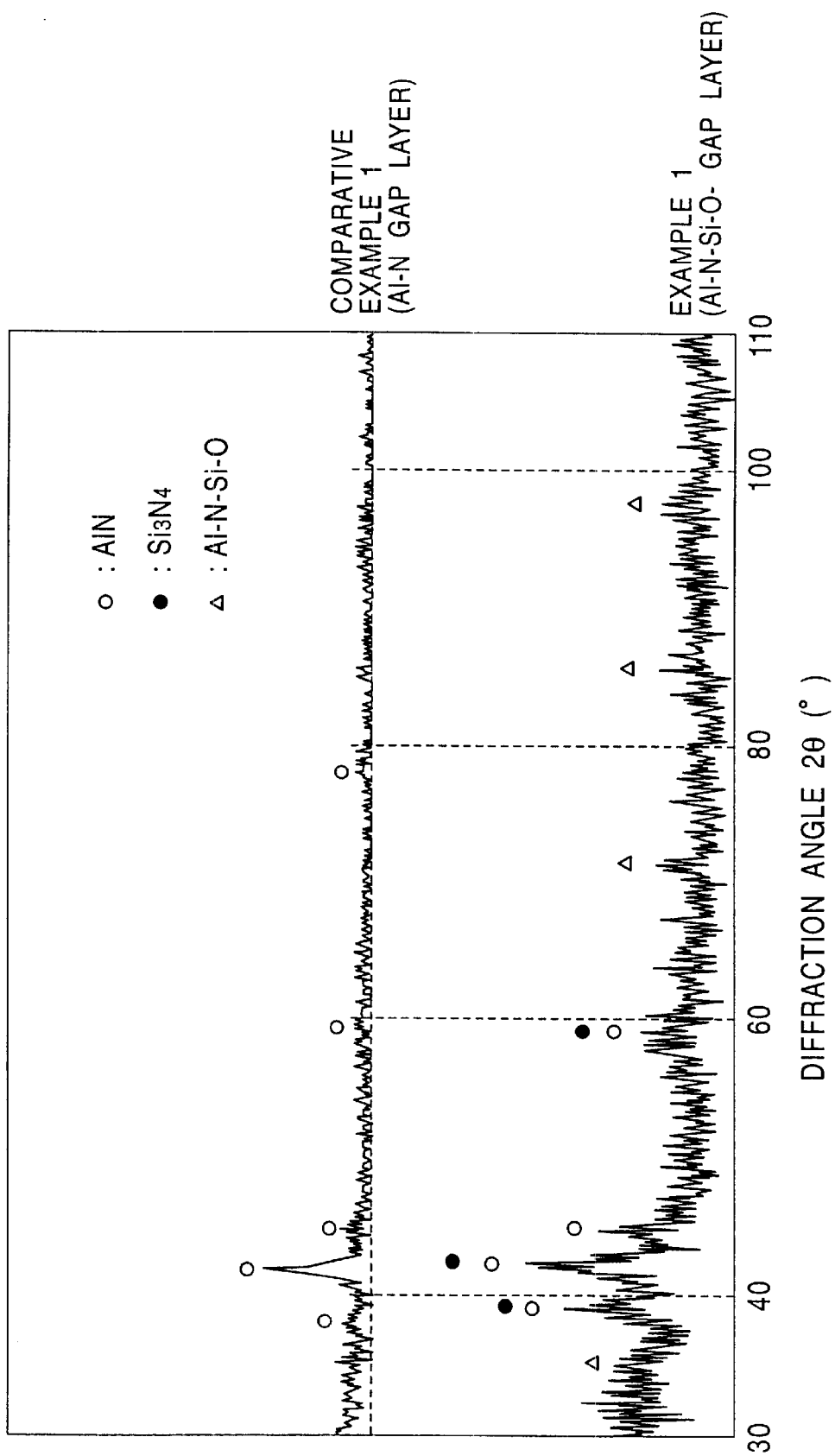
FIG. 6 shows the graphs indicating the X-ray diffraction patterns of the structures of the textures of the Al—N—Si—O based gap layer of the sample in Example 1, and of the Al—N based gap layer of the sample in Comparative Example 1.

The results in FIG. 6 indicate that AlN crystals are precipitated in the gap layer according to Comparative Example 1. On the contrary, AlN crystals, $Si_3N_4$ crystals and crystals based on four components of Al—N—Si—O were deposited in the gap layer according to Example 1.

Example 2

A sample (Example 2) was prepared by almost the same method as used in Example 1, except that a gap layer with a composition of $Al_{32}N_{51}Si_9O_8$ was deposited on the substrate comprising Si.

The heat conductance, compression stress, etching rate with a strong alkaline solution and surface electric resistance of the sample in Example 2 were investigated. The results are listed in TABLE 1.

The heat conductance was assessed from the coefficient (a-value) obtained by approximating the temperature increase curve of the AMR element layer when a sensing current was flowed through the MR head with a secondary function, wherein the gap layer of the MR head shown in FIG. 5 was composed of the materials listed in TABLE 1. The smaller a-value denotes better heat conductance. In TABLE 1, the symbols (⊚), (◯) and (×) correspond to the a-values of larger than 1.3, 1.3 to 2.2 and smaller than 2.2, respectively. The film stress was evaluated by the compression stress measured from the variation of warp of the substrate before and after deposition, and the larger value corresponds to larger stress. The etching rate in the strong alkaline solution was calculated from the step height formed after dipping the sample (a tape was adhered on the surface of the sample at the gap side) in a strong alkaline solution (trade name: AZ-400K made by Hext Co., principal component: KOH) for 2 minutes. The smaller value corresponds to better corrosion resistance against the strong alkaline solution. The surface electric resistance was measured using an insulation tester.

Samples using the Al—N based gap layer (Comparative Example 1), alumina ($Al_2O_3$) gap layer (Comparative Example 2), and Al—N—Si based (the content of Si is 2 at % in composition ratio) gap layer (Comparative Example 3) were prepared for the purpose of comparison. The heat conductance, compression stress, etching rate in the strong alkaline solution and surface electric resistance were investigated by the same method as described above. The results are also shown in TABLE 1.

TABLE 1

| | GAP LAYER MATERIAL | HEAT-CNDUCTANCE | COMPRESSON STRESS (Mpa) | ETCHING RATE WITH ALKALINE SOLUTION (ANGSTROM/MIN) | SURFACE RESISTANCE (Ω) |
|---|---|---|---|---|---|
| COMPARATIVE EXAMPLE 1 | AlN | ⊙ | 2000 | 500 | $10^{10}$ |
| COMPARATIVE EXAMPLE 2 | $Al_2O_3$ | X | 90 | 80 | $10^{12}$ |
| COMPARATIVE EXAMPLE 3 | AlN + 2 at % Si | ○ | 40 | 70 | $10^{11}$ |
| EXAMPLE 2 | $Al_{32}N_{51}Si_9O_8$ | ⊙ | 150 | 10 | $10^{11}$ |

The results shown in TABLE 1 clearly shows that the gap layer comprising the composition of $Al_{32}N_{51}Si_9O_8$ in Example 2 is superior to the gap layer comprising alumina ($Al_2O_3$) in Comparative Example 2 in heat conductance.

Also, the gap layer in Example 2 has smaller film stress than the gap layer comprising AlN in Comparative Example 1.

In addition, the etching rate with the strong alkaline solution of the gap layer in Example 2 is smaller than those of the gap layers in Comparative Examples 1 and 2, and the Al—N—Si based gap layer (containing 2 at % of Si) in Comparative Example 3.

The gap layer in Example 2 has a practically applicable surface electric resistance.

When corrosion resistance of the gap layer in Example 2 was measured by the same method as used for investigating corrosion resistance against the strong alkaline solution, except that the sample was dipped in water. The results showed that the gap layer in Example 2 has better corrosion resistance against water than the gap layers in Comparative examples 1 to 3.

Example 3

A lower gap layer comprising a composition of $Al_{32}N_{51}Si_9O_8$ and lamination layers, each having a thickness of 1000 angstroms, were sequentially deposited on a substrate comprising Si using a plurality of targets and a microwave magnetron sputtering apparatus. This laminated member was manufactured by laminating a soft magnetic layer (Ni—Fe—Nb alloy film), non-magnetic layer (Ta), ferromagnetic layer (Ni—Fe alloy film) and protective layer (Ta film) in this order from the lower gap layer side.

An AMR element layer was manufactured by removing both sides of the laminated member by applying the photolithographic process and ion milling to the laminated member to leave a track width portion (the width of magnetic sensing portion) behind. Ferromagnetic layers (Co—Pt alloy) with a thickness of 300 angstroms were provided at both sides of the AMR element layer, followed by laminating a non-magnetic layer (Ta) with a thickness of 50 angstroms and an electrode layer (Cr) with a thickness of 1200 angstroms by sputtering on each ferromagnetic layer. A magnetic field of an intensity of 200 Oe was applied along the direction crossing the foregoing applied magnetic field at an angle of 90° when the laminated layers had been deposited.

The laminated member was finally patterned by a photolithographic process to form a track width of 2 μm, thus preparing an AMR element sample (Example 3).

Figure 7:
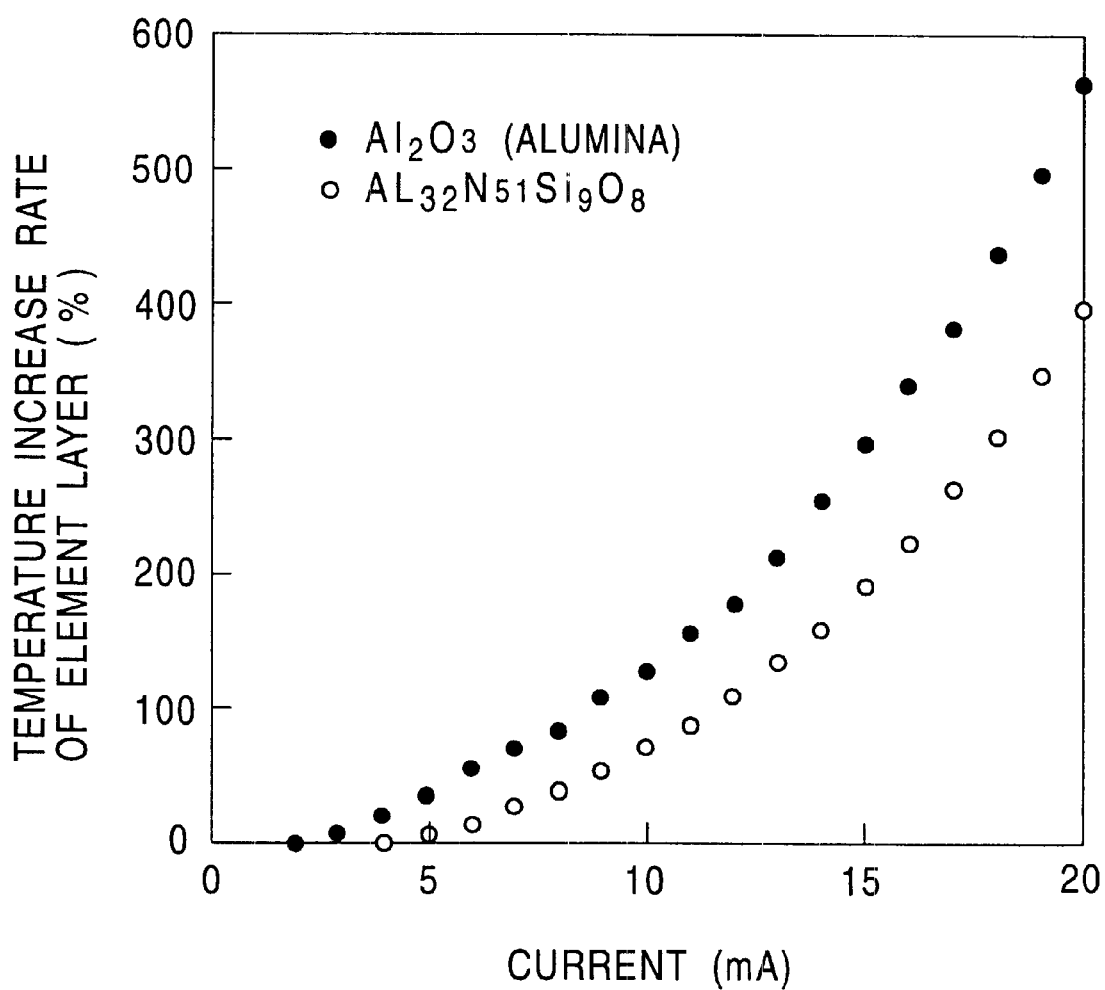
FIG. 7 is a graph showing the relation between the stationary sensing current flowing through the MR head and the temperature increase rate (%) of the AMR element.
Figure 8:
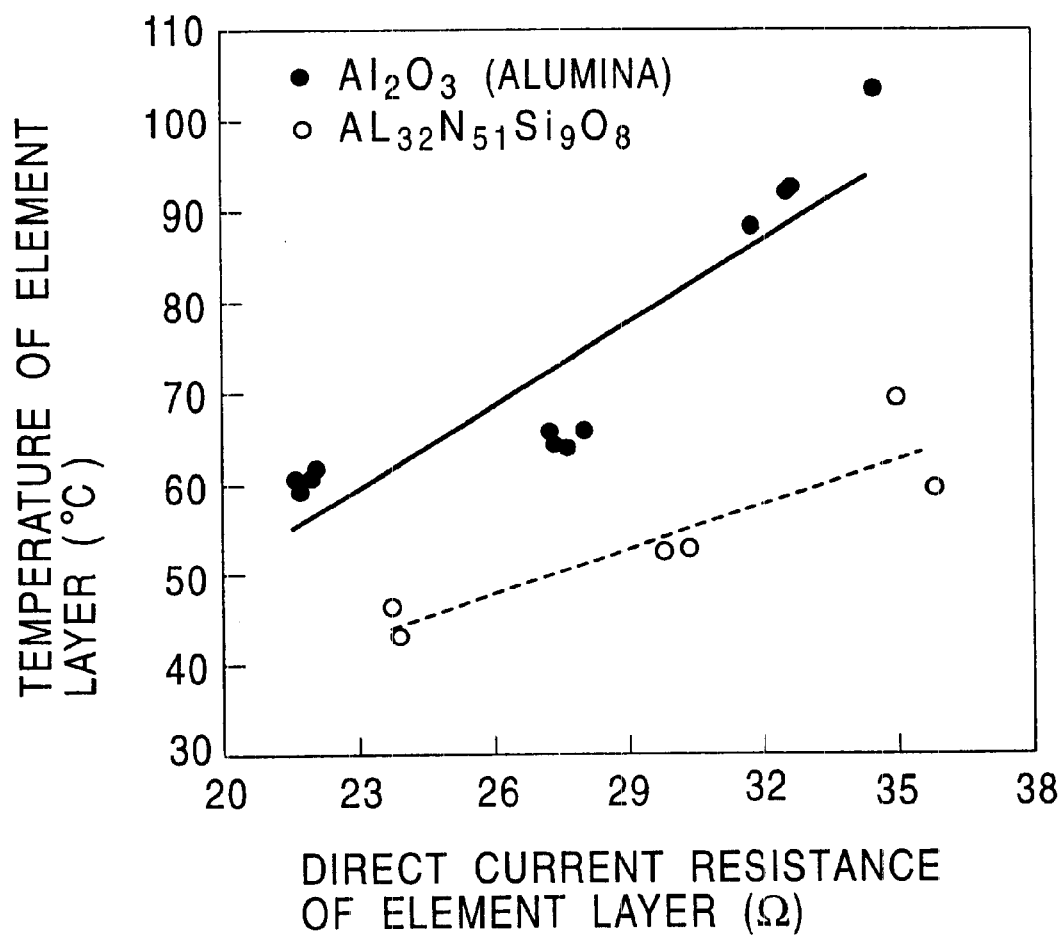
FIG. 8 is a graph showing the relation between the temperature and resistance when the temperature is increased by flowing a constant sensing current through the MR head.
Figure 9:
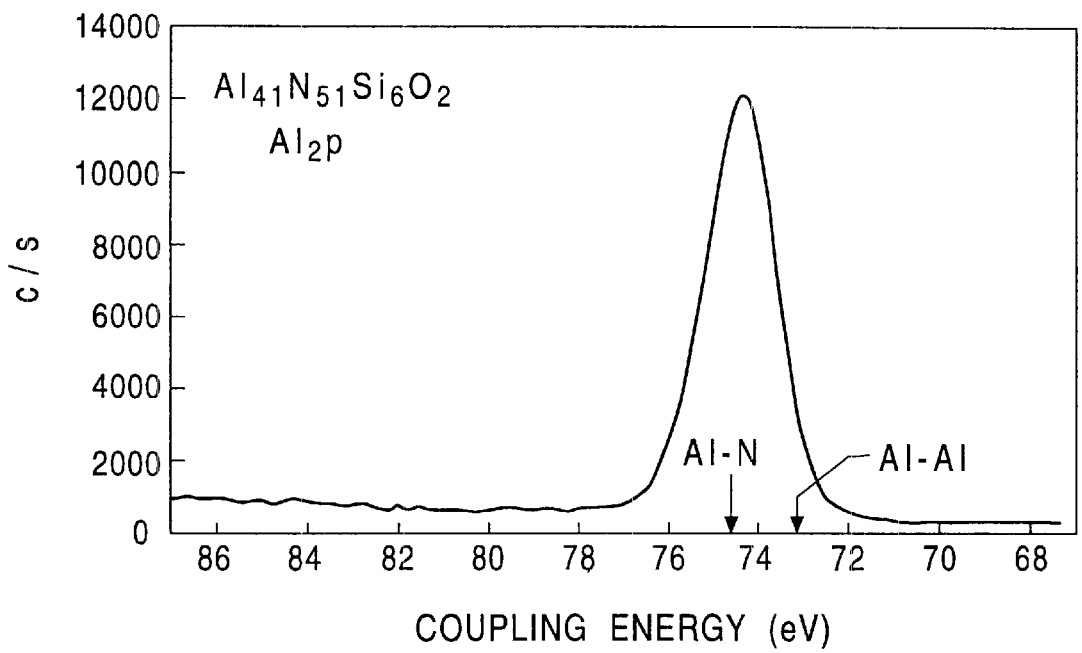
FIG. 9 shows a photoelectron spectrum of the surface of the gap layer comprising the composition of $Al_{41}N_{51}Si_6O_2$ in the sample in Example 4.

Temperature increase rate of the AMR element layer was measured by changing the intensity of the sensing current flowing through the AMR element sample (Example 3) obtained by the production method described above. The results are shown in FIG. 7. The temperature increase rate was measured by the steps comprising placing the AMR element in an oven while flowing a given sensing current (15 mA) to previously measure the relation between the temperature and resistance (FIG. 8) when the temperature was increased from 25° C. to 145° C., and measuring the relation between the electric current and resistance when the electric current flowing through the AMR head provided with the AMR element sample in Example 3 was increased at a constant environmental temperature of 25° C. The temperature of the AMR element layer can be determined from the resistance obtained and the previously determined relation between the temperature and resistance (the temperature is determined using the resistance as an intermediate value).

An AMR element sample (Comparative Example 4) was prepared by the same method as used in Example 3 for the comparative purposes, except that the lower gap layer were composed of $Al_2O_3$ (alumina). The results of measurements of the temperature increase rate (%) of the AMR element, measured by changing the sensing electric current flowing through the AMR head provided with the AMR element sample according to Comparative Example 4, are also shown in FIG. 7.

The results in FIG. 7 clearly show that the AMR element sample in Example 3, in which the lower gap layer is composed of an insulation layer with the composition of $Al_{32}N_{51}Si_9O_8$, has a smaller temperature increase rate than the AMR element sample in Comparative Example 4 having the lower gap layer composed of $Al_2O_3$ when the sensing current is increased, indicating that the heat generated by the sensing current is efficiently dissipated.

Example 4

Samples (Examples 4 to 6) were prepared by the same method as in Example 1, except that the composition ratio of Al, N and Si comprising the gap layer was changed. The gap layers of Example 4, Example 5 and Example 6 prepared herein had compositions comprising $Al_{41}N_{51}Si_6O_2$, $Al_{32}N_{51}Si_9O_8$ and $Al_{32}N_{50}Si_8O_{10}$, respectively.

The texture of the gap layer of the sample prepared in Example 4 were analyzed by X-ray photoelectron spectrophotometry (XPS). The results are shown in FIGS. 9 to 12.

The texture of the gap layer of the sample prepared in Example 5 were analyzed by X-ray photoelectron spectrophotometry (XPS). The results are shown in FIGS. 13 to 16.

The texture of the gap layer of the sample prepared in Example 6 were analyzed by X-ray photoelectron spectrophotometry (XPS). The results are shown in FIGS. 17 to 20.

From the results shown in FIGS. 9 to 12, FIGS. 13 to 16 and FIGS. 17 to 20, peaks supposed to correspond to chemical bonds between Al and N, Si and N and Si and O are observed in the samples according to Examples 4 to 6.

Figure 10:
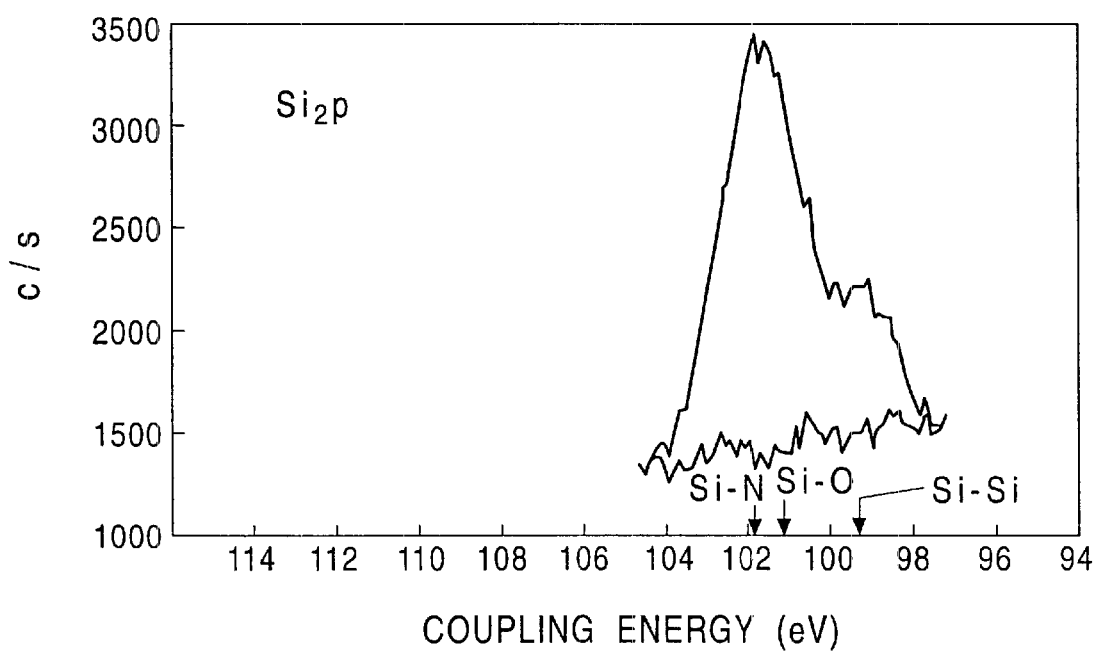
FIG. 10 shows a photoelectron spectrum of the surface of the gap layer comprising the composition of $Al_{41}N_{51}Si_6O_2$ in the sample in Example 4.
Figure 11:
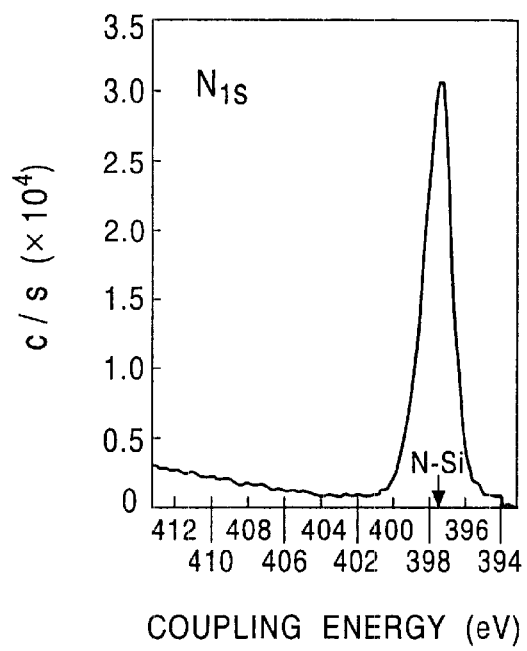
FIG. 11 shows a photoelectron spectrum of the surface of the gap layer comprising the composition of $Al_{41}N_{51}Si_6O_2$ in the sample in Example 4.
Figure 12:
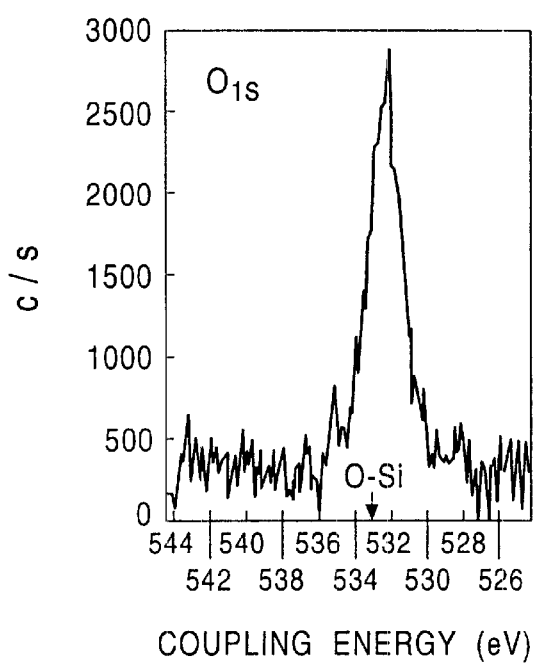
FIG. 12 shows a photoelectron spectrum of the surface of the gap layer comprising the composition of $Al_{41}N_{51}Si_6O_2$ in the sample in Example 4.
Figure 13:
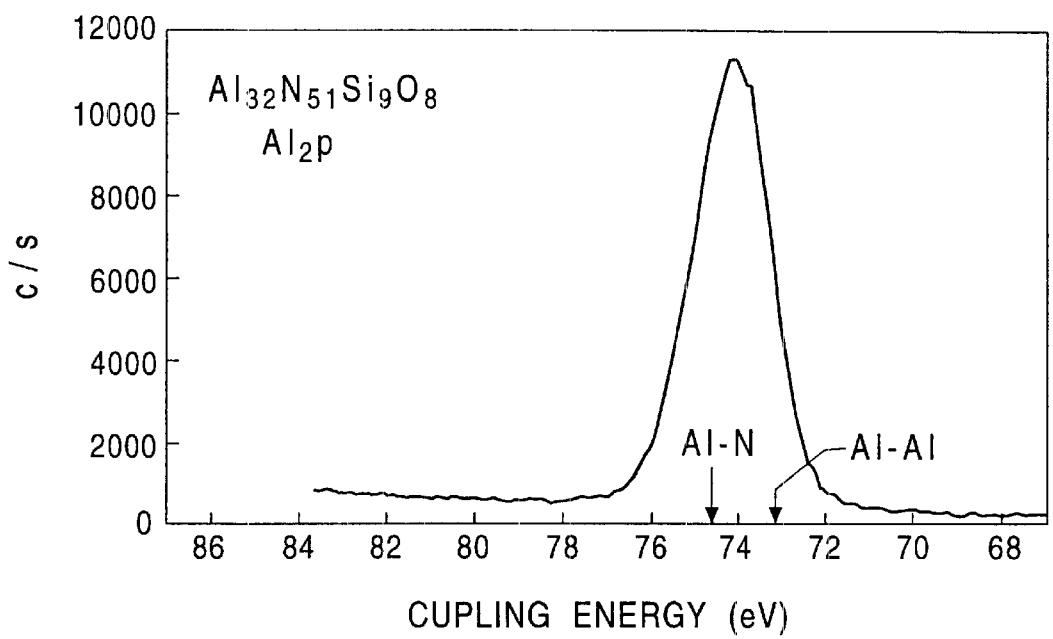
FIG. 13 shows a photoelectron spectrum of the surface of the gap layer comprising the composition of $Al_{32}N_{51}Si_9O_8$ in the sample in Example 5.
Figure 14:
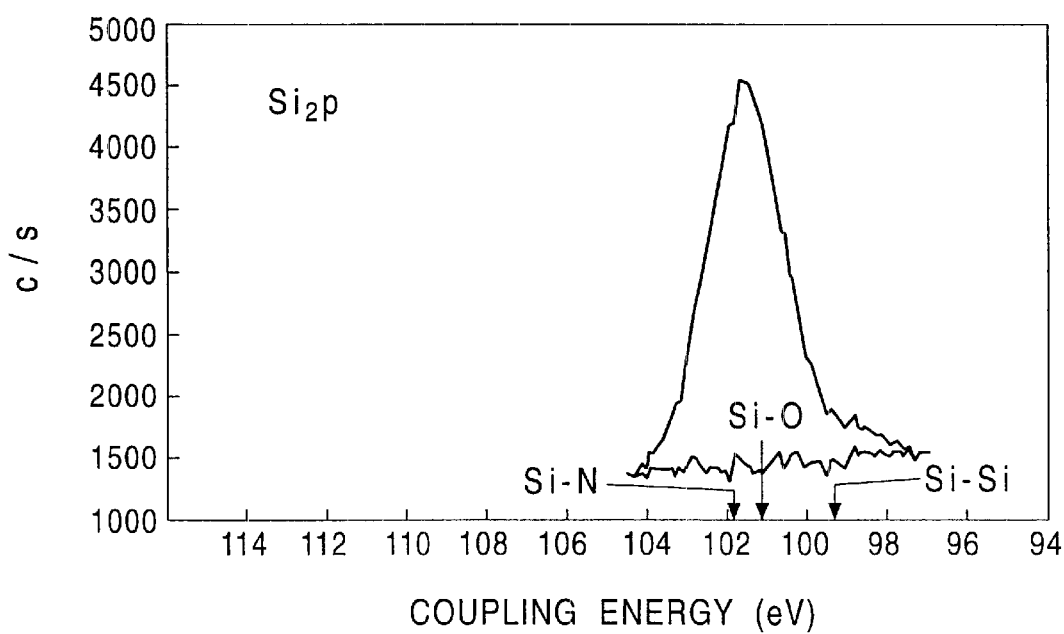
FIG. 14 shows a photoelectron spectrum of the surface of the gap layer comprising the composition of $Al_{32}N_{51}Si_9O_8$ in the sample in Example 5.
Figure 15:
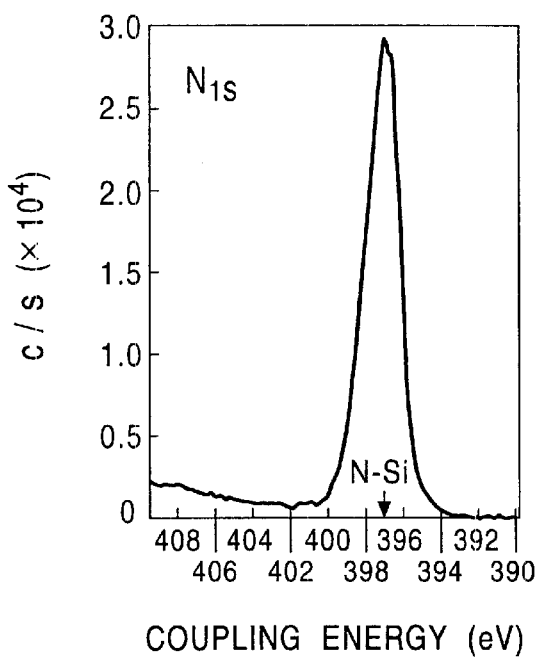
FIG. 15 shows a photoelectron spectrum of the surface of the gap layer comprising the composition of $Al_{32}N_{51}Si_9O_8$ in the sample in Example 5.
Figure 16:
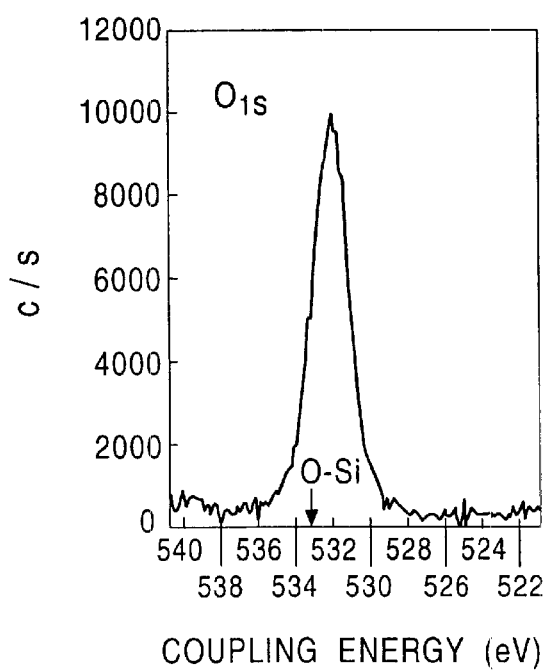
FIG. 16 shows a photoelectron spectrum of the surface of the gap layer comprising the composition of $Al_{32}N_{51}Si_9O_8$ in the sample in Example 5.
Figure 17:
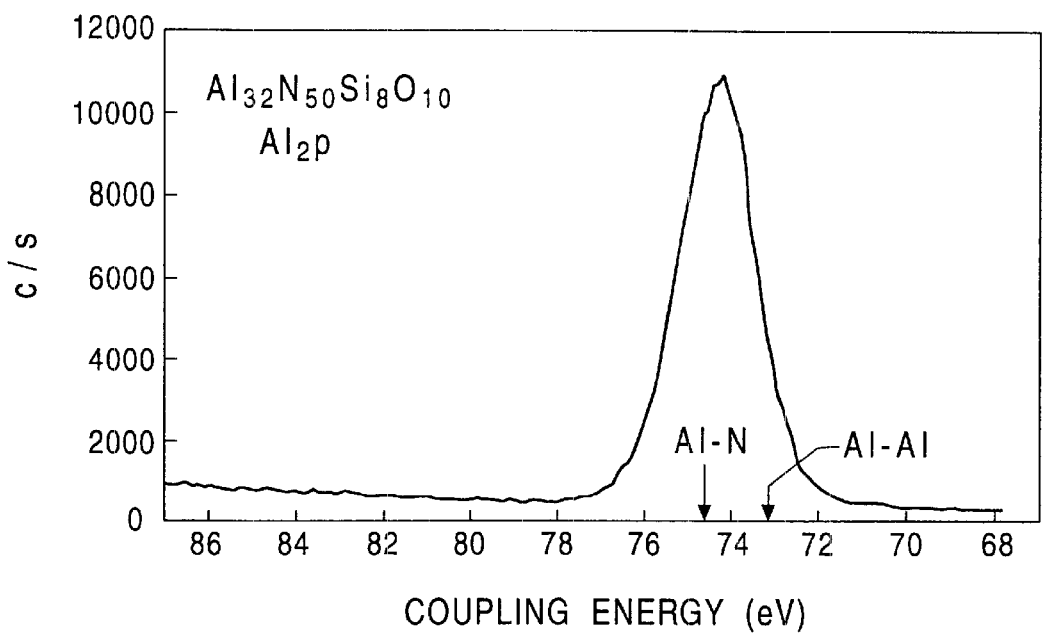
FIG. 17 shows a photoelectron spectrum of the surface of the gap layer comprising the composition of $Al_{32}N_{50}Si_8O_{10}$ in the sample in Example 6.
Figure 18:
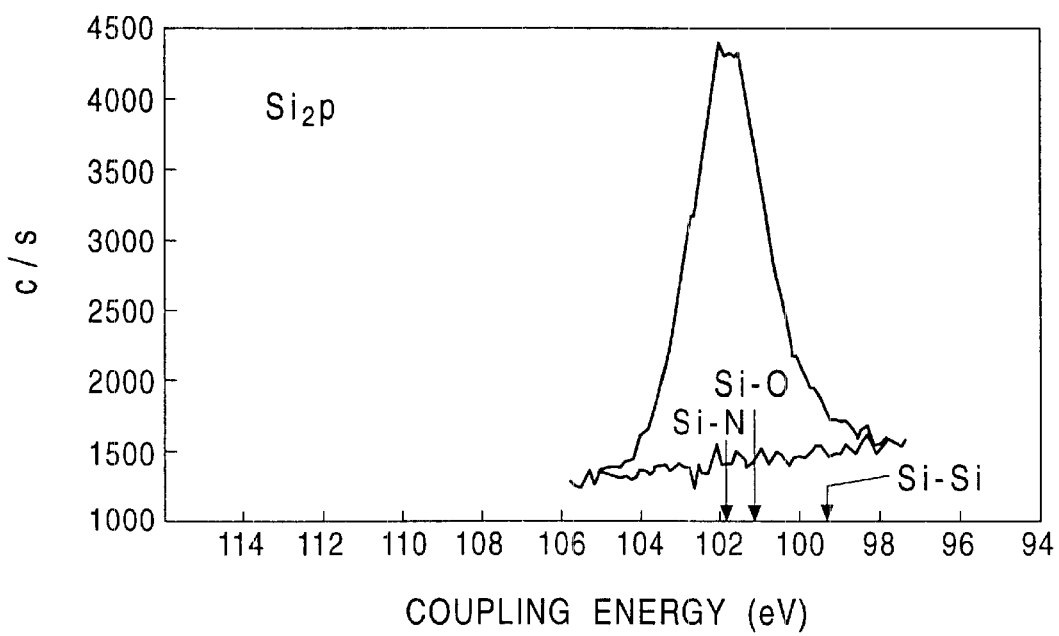
FIG. 18 shows a photoelectron spectrum of the surface of the gap layer comprising the composition of $Al_{32}N_{50}Si_8O_{10}$ in the sample in Example 6.
Figure 19:
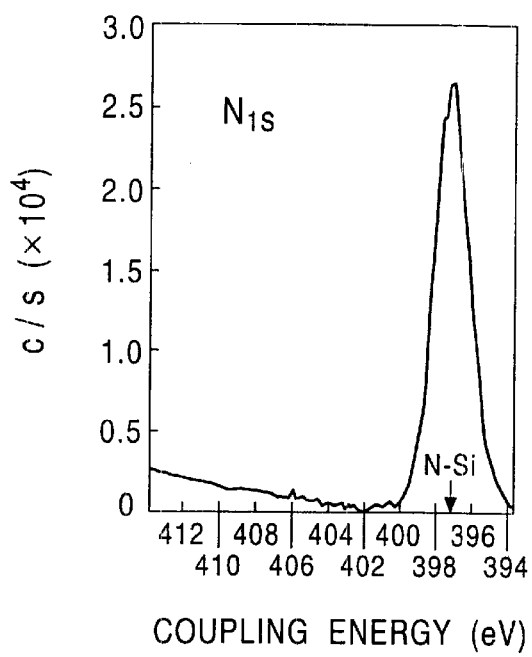
FIG. 19 shows a photoelectron spectrum of the surface of the gap layer comprising the composition of $Al_{32}N_{50}Si_8O_{10}$ in the sample in Example 6.
Figure 20:
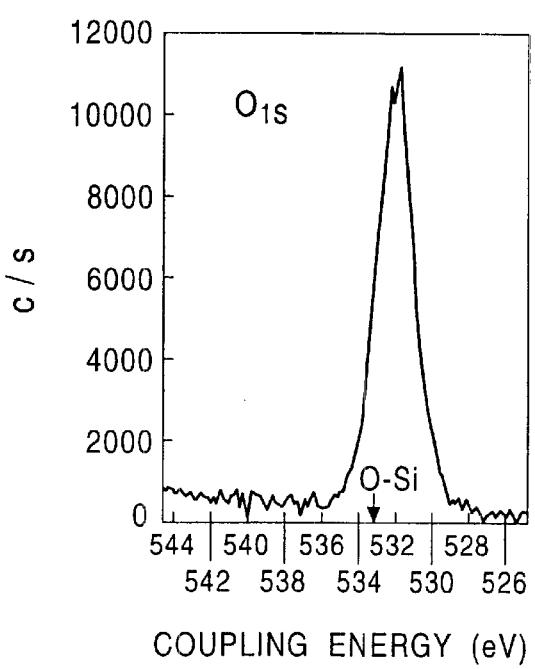
FIG. 20 shows a photoelectron spectrum of the surface of the gap layer comprising the composition of $Al_{32}N_{50}Si_8O_{10}$ in the sample in Example 6.

The peaks supposed to correspond to the Si—Si bond in FIGS. 14 and 18 are smaller than the peak supposed to correspond to the Si—Si bond in FIG. 10. The peak supposed to correspond to the N—Si bond in FIG. 15 is observed to be smaller than the peak supposed to correspond to the N—Si bond in FIG. 12. The peak supposed to correspond to the O—Si bond in FIG. 20 is observed to be smaller than the peak supposed to correspond to the o-Si bond in FIG. 16. These results indicate that the amount of Si bonded to N or O is increased in the Al—N—Si—O based gap layer when the content of Si and O are increased.

Example 5

A sample was prepared by the same method as in Example 1, except that the amount of addition of Si was changed in depositing a gap layer comprising a Al—N—Si—O based composition. The content of O in the gap layer prepared in this example was about 8 at %.

Heat conductance, compression stress, etching rate with a strong alkaline solution and surface resistance with respect to the gap layer of the sample prepared were measured by the same method as in Example 2. The results are shown in FIG. 21.

Figure 21:
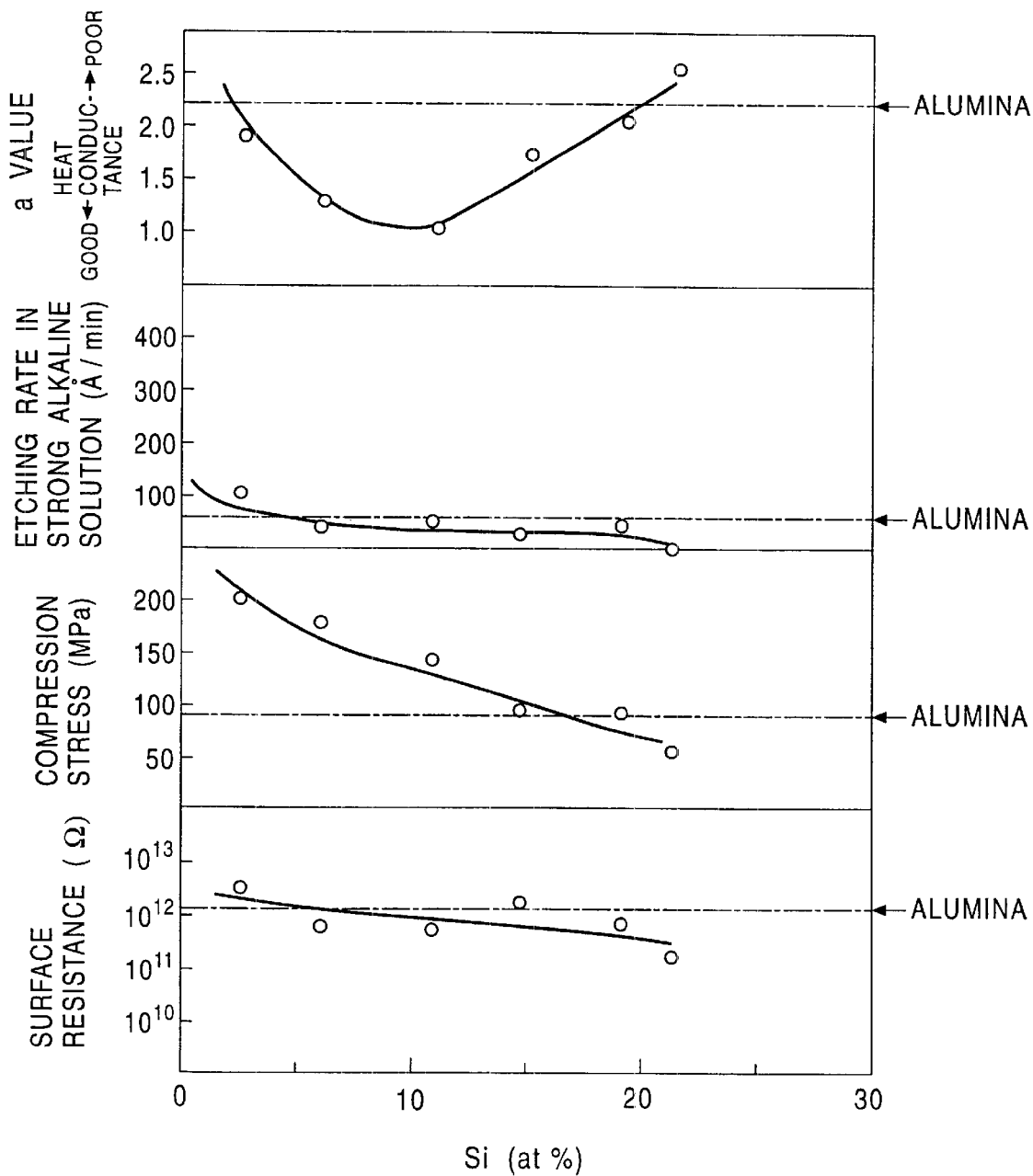
FIG. 21 is a graph showing heat conductance, corrosion resistance, film stress and surface electric resistance depending on the amount of addition of Si in the gap layer.

FIG. 21 shows the graphs indicating heat conductance, compression stress, etching rate with a strong alkaline solution and surface resistance depending on the amount of addition of Si in the gap layer. The numerical values denoted beneath the linear lines indicating the relations between the characteristics such as heat conductance and the amount of addition of Si in FIG. 21 correspond to the amount of addition of Si (at %), and the numerical values above the linear lines correspond to respective characteristics such as heat conductance.

The dotted broken lines in FIG. 21 show the heat conductance, corrosion resistance, film stress and surface resistance of the gap layer in Comparative Example 2 composed of alumina for comparison.

The results shown in FIG. 21 clearly how that, when the gap layer is composed of an Al—N—Si—O based composition, heat conductance and corrosion resistance become better than those of the gap layer having a Si content of 2 to 20 at % while having a smaller film stress than that of the gap layer made of alumina. The surface resistance was also proved to have no practical problems. More preferably, when the content of Si is adjusted to 5 to 15 at %, heat conductance becomes far superior to the gap layer comprising alumina while having better corrosion resistance against the alkaline solution. The Al—N—Si—O based gap layer has better corrosion resistance than the gap layer comprising alumina because $Si_3N_4$ crystals comprising Si and N have been precipitated as shown in FIG. 6, or because Si is chemically bound to N or O as shown in FIGS. 9 to 20.

Resistance against water was investigated with respect to the Al—N—Si—O based gap layer having a Si content of 2 to 20 at % by the same method as investigating corrosion resistance against the strong alkaline solution, except that the sample was dipped in water, proving that corrosion resistance against water is good as well.

Example 6

A sample was prepared by the same method as in Example 1, except that the amount of addition of oxygen for forming the gap layer comprising the Al—N—Si—O based composition was changed. The gap layer as prepared herein contained about 9 at % of Si in the gap layer.

Then, heat conductance, compression stress, etching rate with the strong alkaline solution and surface resistance of the gap layer of the sample prepared were measured by the same method as in Example 2. The results are shown in FIG. 22.

Figure 22:
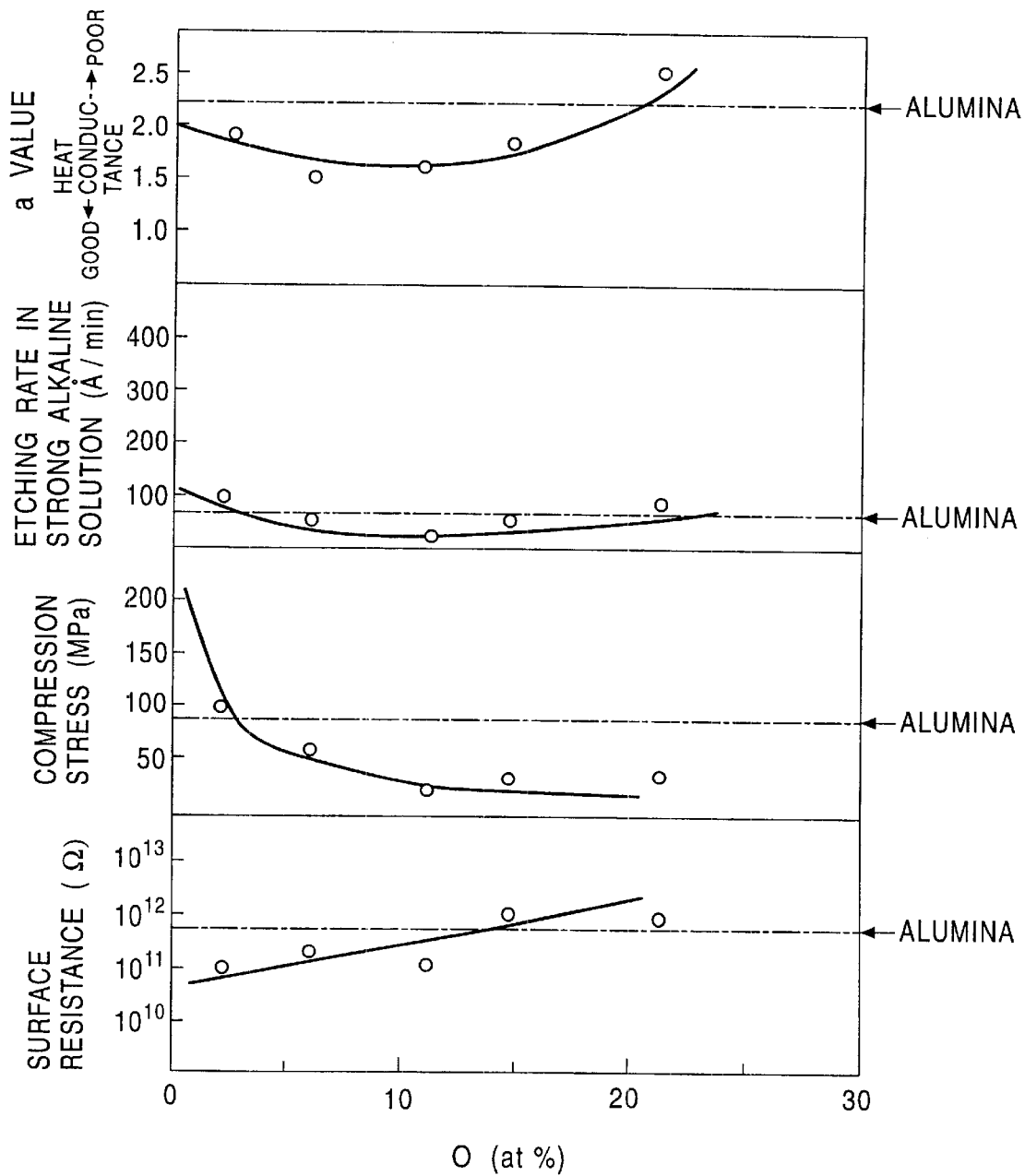
FIG. 22 is a graph showing heat conductance, corrosion resistance, film stress and surface electric resistance depending on the amount of addition of O in the gap layer.
Figure 23:
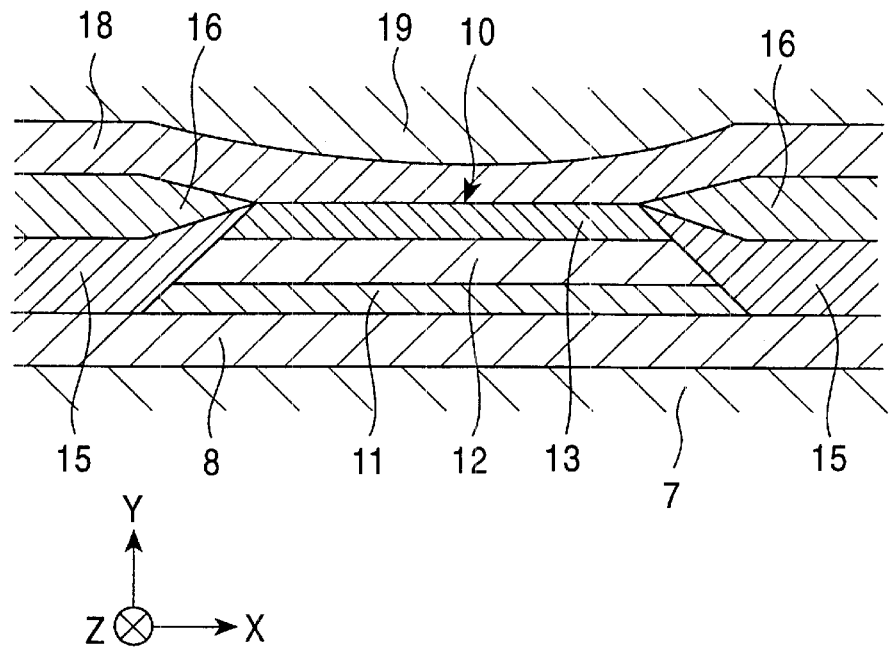
FIG. 23 is a cross section showing one example of the structure of the conventional AMR head.
Figure 24:
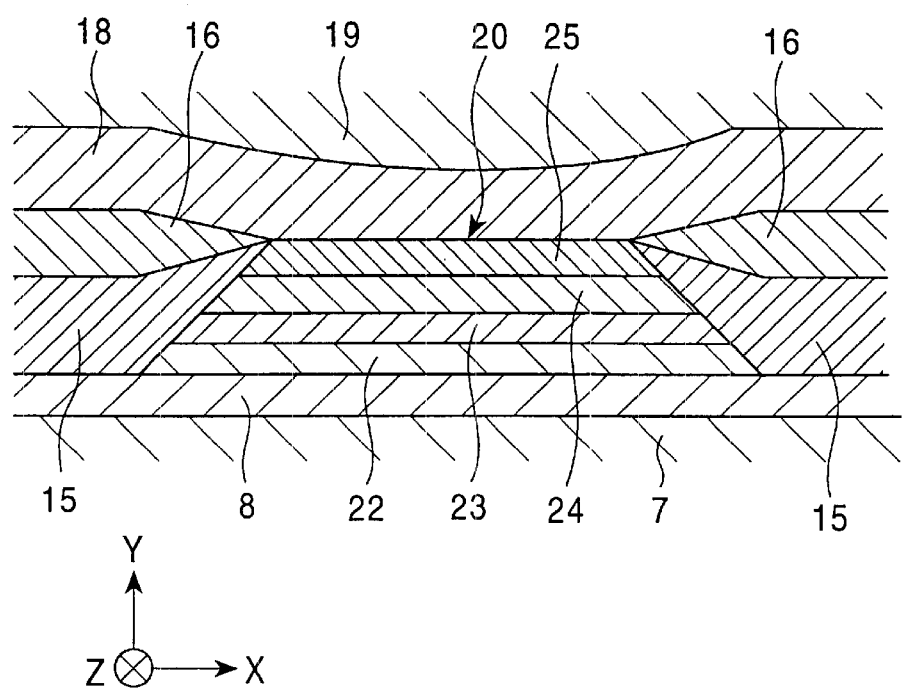
FIG. 24 is a cross section showing one example of the structure of the conventional GMR head.

FIG. 22 shows the graphs of the heat conductance, compression stress, etching rate with the strong alkaline solution and surface resistance of the gap layer depending on the amount of addition of O. The numerical values denoted beneath the linear lines indicating the relations between the characteristics such as heat conductance and the amount of addition of O in FIG. 22 correspond to the amount of addition of O (at %), and the numerical values above the linear lines correspond to respective characteristics such as heat conductance.

The dotted broken lines in FIG. 22 show the heat conductance, corrosion resistance, film stress and surface resistance of the gap layer in Comparative Example 2 composed of alumina for comparison.

The results shown in FIG. 22 clearly show that the gap layer comprising the Al—N—Si—O based composition has better heat conductance and corrosion resistance against the alkaline solution as well as smaller film stress than the gap layer comprising alumina. Also, the surface resistance involves no practical problem. Preferably, when the content of O is adjusted to 5 to 15 at %, the gap layer has far superior heat conductance than that of the gap layer comprising alumina, as well as better corrosion resistance against the alkaline solution and smaller film stress than those of the gap layer comprising alumina.

The Al—N—Si—O based gap layer has better corrosion resistance than the gap layer comprising alumina because Si is chemically bound to N or O as shown in FIGS. 9 to 20.

Corrosion resistance of the Al—N—Si—O based gap layer containing zero to 20 at % of O against water was investigated by the same method for investigating the corrosion resistance against the strong alkaline solution, except that the sample was dipped in water, proving that corrosion resistance against water was also good.

The thin film magnetic head according to the present invention as hitherto described has a gap layer having an insulation layer containing at least Al, N, X and O (X represents at least one or plural elements selected from Si, B, Ge and C). Accordingly, the heat generated by the stationary sensing current can be efficiently dissipated to enable the output level of the magnetic head to be improved. Moreover, a sufficient intensity of exchange anisotropic magnetic field required for the thin film can be applied without causing any Barkhausen noise while obtaining resistance change with good linear responses, thereby making read performance excellent.

The gap layer comprising a highly heat-conductive insulation layer containing at least Al, N, X and O has good corrosion resistance against the strong alkaline solution and water. Also, the gap layer is never peeled off during or after forming the MR head since the layer has a small film resistance, enabling a reliable product to be provided.

What is claimed is:

1. A thin film magnetic head comprising at least a magnetoresistive element layer formed on a lower shield layer via a lower gap layer, electrode layers for imparting a sensing current to the magnetoresistive element layer, and an upper shield layer formed on the electrode layer via an upper gap layer, wherein at least one of the lower gap layer and upper gap layer has a highly heat-conductive insulation layer comprising at least Al, N, X and O, the element X being at least one element selected from Si, B, Ge and C, and the highly heat-conductive insulation layer has a crystal texture comprising fine crystalline AlN grains and a crystal comprising at least two elements selected from X, N and O.

2. A thin film magnetic head according to claim 1, wherein the element X in the highly heat-conductive insulation layer is chemically bonded to at least one of the elements O and N.

3. A thin film magnetic head according to claim 1, wherein the X content and the O content in the highly heat-conductive insulation layer are each in a range of more than 0 atomic percent to not more than 20 atomic percent.

4. A thin film magnetic head according to claim 1, wherein the X content and the O content in the highly heat-conductive insulation layer are each in the range of 5 to 15 atomic percent.

5. A thin film magnetic head comprising at least a magnetoresistive element layer formed on a lower shield layer via a lower gap layer, electrode layers for imparting a sensing current tb the magnetoresistive element layer, and an upper shield layer formed on the electrode layer via an upper gap layer, wherein at least one of the lower gap layer and upper gap layer has a highly heat-conductive insulation layer comprising at least Al, N, X and O, the element X being at least one element selected from Si, B, Ge and C, and wherein the highly heat-conductive insulation layer has a crystal texture comprising a mixed phase of a fine crystalline phase comprising fine crystalline AlN grains and an amorphous phase comprising at least two elements selected from X, N, and O.

6. A thin film magnetic head according to claim 5, wherein the element X in the highly heat-conductive insulation layer is chemically bonded to at least one of the elements O and N.

7. A thin film magnetic head according to claim 5, wherein the X content and the O content in the highly heat-conductive insulation layer are each in a range of more than 0 atomic percent to not more than 20 atomic percent.

8. A thin film magnetic head according to claim 5, wherein the X content and the O content in the highly heat-conductive insulation layer are each in the range of 5 to 15 atomic percent.

* * * * *

UNITED STATES PATENT AND TRADEMARK OFFICE
CERTIFICATE OF CORRECTION

PATENT NO.   : 6,459,551 B1
DATED        : October 1, 2002
INVENTOR(S)  : Yasuo Hayakawa It is certified that error appears in the above-identified patent and that said Letters Patent is hereby corrected as shown below:

Column 17,
Line 23, delete "tb" and substitute -- to -- in its place.

Signed and Sealed this

Fourth Day of March, 2003

JAMES E. ROGAN
*Director of the United States Patent and Trademark Office*